United States Patent [19]

Hirano

[11] Patent Number: 4,632,178

[45] Date of Patent: Dec. 30, 1986

[54] INTERCOOLER FOR SUPERCHARGED INTERNAL COMBUSTION ENGINE

[75] Inventor: Yoshinori Hirano, Yokohama, Japan

[73] Assignee: Nissan Motor Co., Ltd., Yokohama, Japan

[21] Appl. No.: 664,324

[22] Filed: Oct. 24, 1984

[30] Foreign Application Priority Data

Oct. 26, 1983 [JP] Japan .................................. 58-200353

[51] Int. Cl.⁴ ........................ B60H 1/00; F28D 15/00
[52] U.S. Cl. .................................. 165/39; 123/41.08; 123/41.21; 123/41.27; 123/563; 165/104.27
[58] Field of Search ............................. 165/104.27, 39; 123/41.08, 41.03, 41.21, 41.54, 41.27, 41.44, 563; 60/599

[56] References Cited

U.S. PATENT DOCUMENTS

| | | | |
|---|---|---|---|
| 1,338,722 | 5/1920 | Fekett | 123/41.03 |
| 1,792,520 | 2/1931 | Weinhardt | 123/41.03 |
| 2,083,611 | 6/1937 | Marshall | 62/125 |
| 2,318,834 | 5/1943 | Birkigt | 123/563 |
| 3,139,073 | 6/1964 | White et al. | 123/41.54 |
| 3,981,279 | 9/1976 | Bubniak et al. | 123/41.14 |
| 4,061,187 | 12/1977 | Rajasekaran et al. | 123/41.54 X |
| 4,342,200 | 8/1982 | Lowi, Jr. | 62/191 |
| 4,499,866 | 2/1985 | Hirano | 123/41.21 |
| 4,538,554 | 9/1985 | Hayashi | 123/41.21 |
| 4,549,505 | 10/1985 | Hirano | 123/41.21 X |

FOREIGN PATENT DOCUMENTS

| | | |
|---|---|---|
| 558399 | 6/1958 | Canada .......................... 165/104.27 |
| 736381 | 5/1943 | Fed. Rep. of Germany . |
| 57-46016 | 3/1982 | Japan . |
| 1032460 | 6/1966 | United Kingdom . |

*Primary Examiner*—Michael Koczo
*Assistant Examiner*—Randolph A. Smith
*Attorney, Agent, or Firm*—Schwartz, Jeffery, Schwaab, Mack, Blumenthal & Evans

[57] ABSTRACT

An intercooler includes a first heat exchanger into which liquid coolant is sprayed and subsequently converted to vapor via the absorption of its latent heat of vaporization. The vapor is condensed in a radiator under the influence of a fan. The condensate is pumped back to the first heat heat exchanger via an thermostatically controlled expansion valve. When the intercooler is not in use it is filled with liquid coolant to prevent the intrusion of contaminating air. Excess coolant may be forced into the system when cold to purge out any non-condensible matter.

12 Claims, 7 Drawing Figures

4,632,178

INTERCOOLER FOR SUPERCHARGED INTERNAL COMBUSTION ENGINE

BACKGROUND OF THE INVENTION

1. Field of the Invention

The present invention relates generally to an intercooler for a supercharged internal combustion engine and more specifically to a self-contained intercooler wherein coolant is evaporated under reduced pressure in a manner to utilize the latent heat of vaporization thereof and the vapor used as a vehicle for removing heat from the intercooler.

2. Description of the Prior Art

In order to improve engine performance superchargers especially exhaust gas driven turbo-chargers are often fitted to internal combustion engines. However, these devices, while improving engine performance, have encountered drawbacks in that the temperature of the air charged into the cylinders increases due to compression (often as high as 150°–170° C.) which reduces the density of the air thus reducing charging efficiency, and tends to induce knocking (in Otto cycle engines). To solve the latter mentioned problem it is usual to retard the ignition timing and/or lower the compression ratio. This of course also tends to reduce engine power output. Accordingly, it has been proposed to interpose an intercooler between the supercharging compressor and the engine cylinders in order to reduce the temperature of the incoming charge.

FIG. 1 shows an example of a previously proposed intercooler arrangement. This arrangement is integrated with the engine cooling system. In this arrangement coolant from a reservoir 1 is fed to a heat exchanger 2 which forms a vital part of the intercooler 3 and to a pressure pump or compressor 4. The pressurized fluid discharged by the pump 4 is circulated through the engine coolant jacket 5 to absorb the heat produced by the engine. The resulting high pressure-temperature mixture of boiling coolant and vapor is ejected toward a condenser through a variable nozzle jet pump 7. Simultaneously, the liquid coolant fed into the intercooler heat exchanger 2 absorbs heat from the supercharged air passing through the intercooler 3 and vaporizes. This vapor is extracted from the heat exchanger and directed to the condenser 6 under the influence of the venturi action produced by the ejection of the high temperature-pressure liquid/vapor mixture ejected from the variable nozzle jet pump 7. The vaporized coolant is condensed in the condenser 6 and returned to the reservoir 1.

However, this arrangement has encountered several drawbacks in that the compressor 4 consumes valuable engine output, in that it is very difficult to control the temperatures in the system to desired levels with any degree of reliability and in that the liquid coolant fed to the intercooler heat exchanger sometimes becomes excessively heated forming a superheated vapor which lowers the heat exchange efficiency of the intercooler. Further, upon stopping the engine the condensation of the vaporized coolant in the system induces a subatmospheric pressure therein which tends to induct air into the system. The system once contaminated with air tends to lose its efficiency due to the pockets and bubbles of air which can absorb little or no heat and which inevitably find their way into the condenser of the system. For further disclosure relating to this device, reference may be had to "MOTOR TREND" published in the U.S. in June 1983 and/or to Japanese Patent Application First Provisional Publication No. Sho 56-146417 (1981).

FIG. 2 shows a second example of a previously proposed intercooler disclosed in Japanese Patent Application First Provisional Publication No. Sho 57-46016 laid open to public inspection on Mar. 16, 1982. In this arrangement liquid coolant from the engine radiator is admitted to a heat exchanging device 9 via a valve 10. This valve is controlled by a level sensor 11 in a manner to maintain an essentially constant level of liquid coolant within the device. The hot supercharged air from the turbo-charger compressor C, passes over and around a plurality of essentially vertically arranged pipes or conduits 12 containing liquid coolant. A vacuum pump or the like 13 driven by an electric motor 14 (or alternatively by way of a mechanical connection with the engine crankshaft) is used to reduce the pressure within the liquid filled portion of the heat exchanger 9 to a level whereat the coolant boils at a suitably low temperature. The coolant vapor extracted from the heat exchanger by the pump 13 is discharged into the conduit 15 leading from the engine coolant jacket 16 to the engine radiator 8 and permitted to mix with the liquid coolant and condense at essentially atmospheric pressure.

However, this arrangement has suffered from the drawbacks that the vacuum pump 13 is relatively large and bulky consuming valuable engine room space as well as engine power and in that temperature control with respect to change in the temperature of the air discharged by the turbocharger tends to be undesirably sluggish.

SUMMARY OF THE INVENTION

It is an object of the present invention to provide an intercooler arrangement which consumes very little engine power, which is efficient and which prevents the intrusion of contaminating air during non-use.

It is a further object of the present invention to provide an intercooler arrangement which can maintain the temperature of the air delivered to the combustion chambers of the engine essentially constant irrespective of sudden fluctuations in the temperature of the air discharged by the compressor of the turbocharger.

In brief, the above objects are fulfilled by an intercooler which includes a first heat exchanger into which liquid coolant is sprayed and subsequently converted to vapor via the absorption of its latent heat of vaporization and wherein the vapor thus produced is condensed in a radiator under the influence of a fan and the condensate pumped back to the first heat heat exchanger via an thermostatically controlled exapansion valve. When the intercooler is not in use it is filled with liquid coolant to prevent the intrusion of contaminating air. Excess coolant may be forced into the system when cold to purge out any non-condensible matter.

More specifically, the present invention takes the form of a device having a passage through which heated fluid flows and a device for cooling the heated fluid comprising: a first heat exchanger exposed to the heated fluid and in which liquid coolant is converted to its gasesous form via absorbing its latent heat of evaporation, a second heat exchanger in fluid communication with the first heat exchanger and in which the vapor generated in the first heat exchanger is condensed back to its liquid form, a device responsive to a parameter which varies with the temperature of the fluid in the passage downstream of the first heat exchanger, for varying the rate of condensation in the second heat exchanger, and a first pump for returning the liquid coolant from the second heat exchanger to the first heat exchanger.

BRIEF DESCRIPTION OF THE DRAWINGS

The features and advantages of the arrangement of the present invention will become more clearly appreciated from the following description taken in conjunction with the accompanying drawings in which.

DESCRIPTION OF THE PREFERRED EMBODIMENTS

Figure 1:
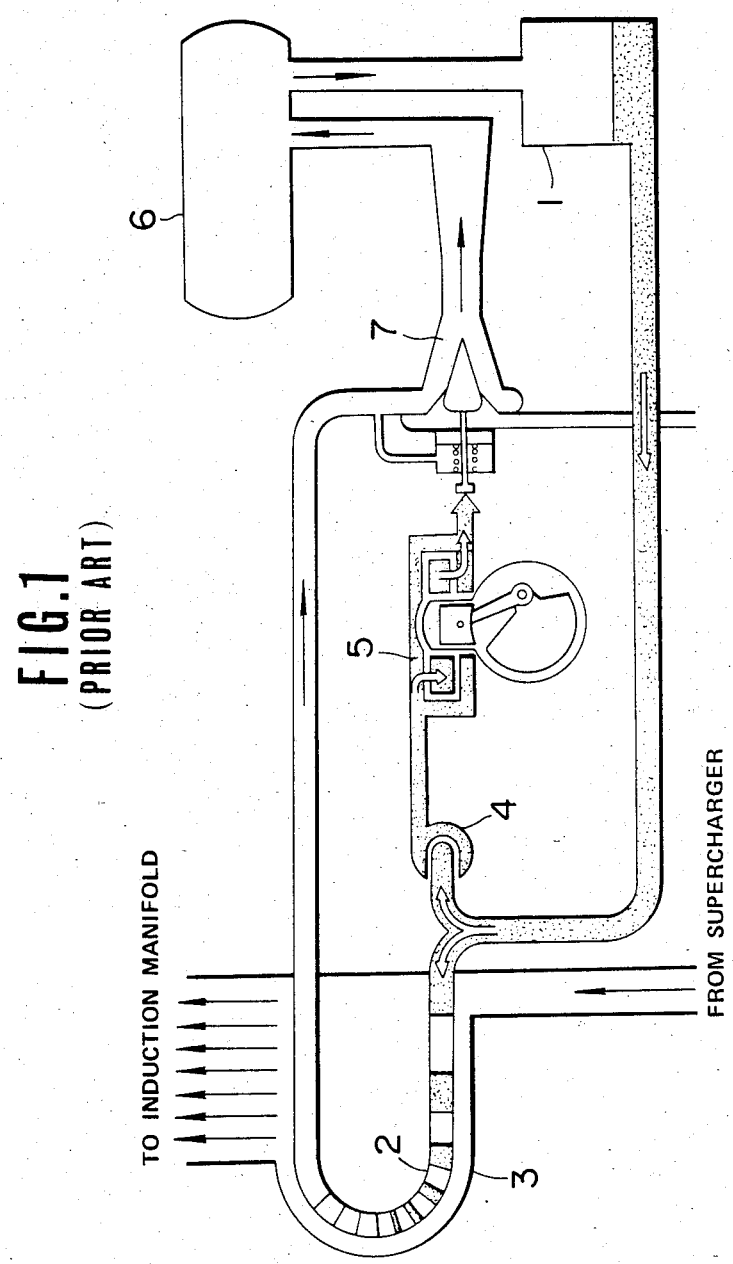
FIGS. 1 and 2 are schematic views of the prior art arrangements disclosed in the opening paragraphs of the instant disclosure.
Figure 2:
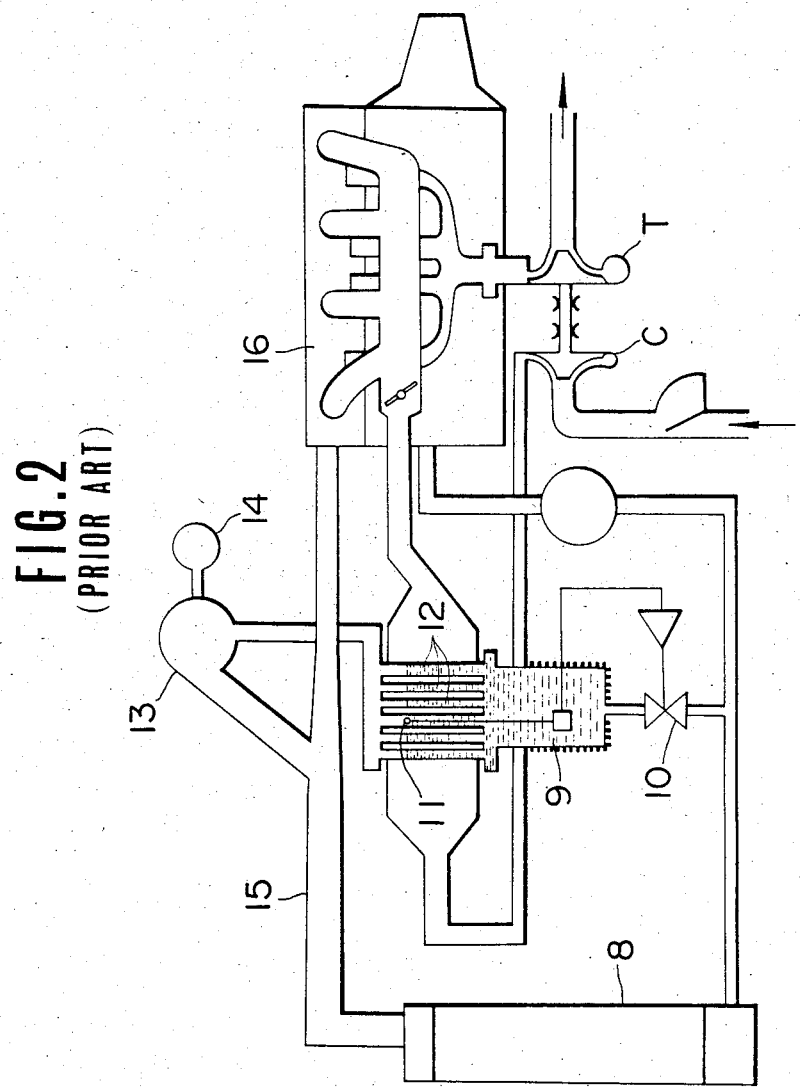
Figure 3:
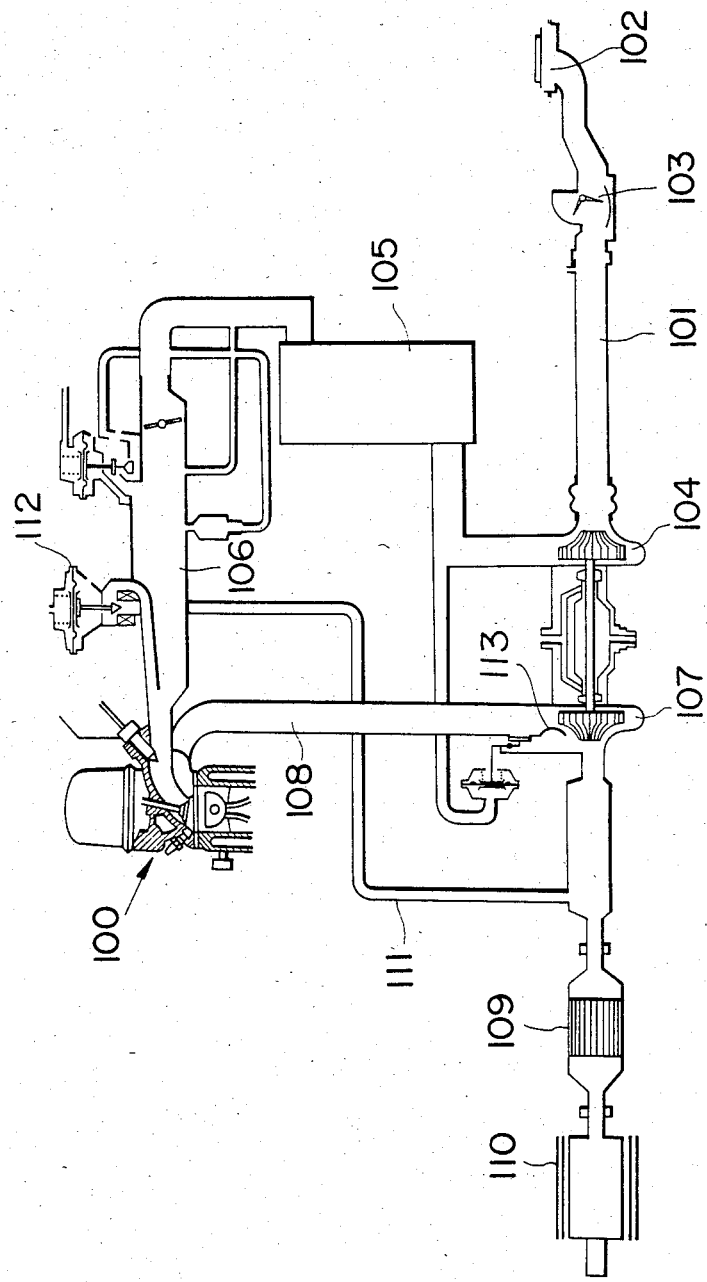
FIG. 3 is a schematic view of an engine system incorporating the present invention.

FIG. 3 shows an engine system in which the present invention is incorporated. As shown, this system includes (merely by way of example) a turbo-charged fuel injected spark ignition Otto cycle engine 100. In this arrangement an induction passage or conduit 101 leads from an air cleaner 102 via an air flow meter 103 to the compressor 104 of the turbo-charger. The output of the compressor 104 is fed through a self-contained intercooler 105 according to the present invention, to an induction manifold 106. The impeller 107 of the turbocharger is supplied hot exhaust gases form the combustion chamber or chambers of the engine via an exhaust manifold 108. Located downstream of the impeller 107 are catalytic converter 109 and muffler 110. An EGR conduit 111 leads from upstream of the catalytic converter 109 to an EGR valve 112 operatively mounted on the induction manifold 106. A wastegate 113 controlled by the supercharging pressure provided by the compressor 104, by-passes exhaust gases around the impeller 107 in the event of excessive supercharging. The wastegate can be replaced with a capacity varying device if desired.

Figure 4:
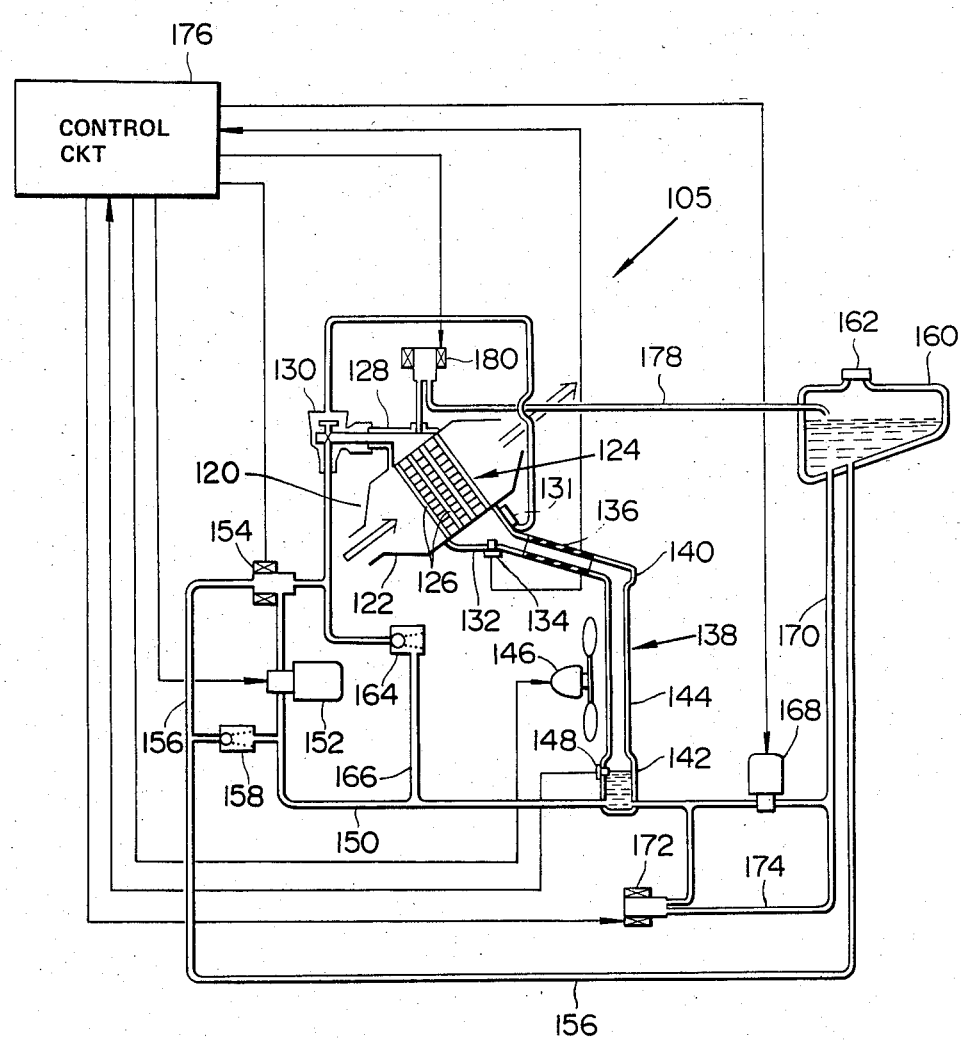
FIG. 4 is a schematic layout of a first embodiment of the present invention.

FIG. 4 shows the intercooler 105 in detail. This device includes a heat exchanger 120 comprised of a housing 122 through which the air under pressure discharged from the compressor 104 passes enroute to the combustion chambers of the engine 100. Disposed within the housing 122 is an evaporator 124. In this embodiment the evaporator 124 takes the form of a plurality of relatively small diameter finned tubes 126 through which coolant is passed. Located at the upstream end of the tubes 126 is a distribution chamber 128 into which coolant is sprayed by an expansion valve 130 in manner to assume an essentially mist-like form. The amount of coolant discharged by the expansion valve 130 is controlled in response to the pressure developed in a bulb 131 filled with a volatile fluid. This bulb is, as shown, attached to the exterior of a collection chamber 132 arranged at the downstream ends of the tubes 126 so as to be sensitive to the temperature of the effluent discharged from the latter.

A temperature sensor 134 is disposed in this chamber for sensing the temperature of the effluent. The outlet of the collection chamber 132 is connected via a suitable conduit 136 with a condenser or radiator 138. In this embodiment the radiator may take the form of upper and lower tanks 140, 142 interconnected by relatively small diameter conduits 144 over which a draft of cooling air is forced by a fan 146. To maintain the maximum effeciency of the radiator, it is preferred to maintain the conduits 144 essentially free of liquid coolant under the normal operation. This maximizes the surface area via which the vapor may release its latent heat to the atmosphere.

The lower tank 142 is provided with a level sensor 148. This sensor may be of the float and reed switch type and which is arranged to close upon the level of coolant having risen above a predetermined level. The lower tank 142 is connected via conduit 150 with a pressure pump 152. This pump communicates with the thermostatically controlled expansion valve 130 via a so called three-way valve 154. This valve 154 is arranged to connect the pump 152 with the expansion valve 130 when de-energized and establish communication between the pump 152 and a return conduit 156 when energized. A relief valve 158 is arranged to establish communication between the return conduit 156 and conduit 150 upon a predetermined pressure differential existing therebetween. The return conduit 156, as shown, leads to a reservoir 160. The interior of this reservoir is constantly maintained at atmospheric pressure via the provision of an air permeable cap 162.

A second relief valve 164 is disposed in a bypass conduit 166 which leads around the pump 152. This valve opens to relieve excess pressure in the event that the pump supplies more coolant than that is required to be injected into the evaporator.

A second pump 168 is disposed in a supply conduit 170 and arranged to pump coolant from the reservoir 160 into the lower tank 142 upon demand. An electromagnetic valve 172 which assumes a closed position when energized is disposed in a conduit 174 which by-passes the second pump 168.

The intercooler further includes a control circuit 176 which controls the operation of the pumps and valves in response to inputs from the level sensor 148 and temperature sensor 134 disposed in the collection chamber 134.

An overflow conduit 178 fluidly connects the highest point of the cooling circuit, which in this embodiment is the distribution chamber 128, with the reservoir 160. Disposed in conduit 178 is an electromagnetic valve 180 which is opened only when energized.

Figure 5:
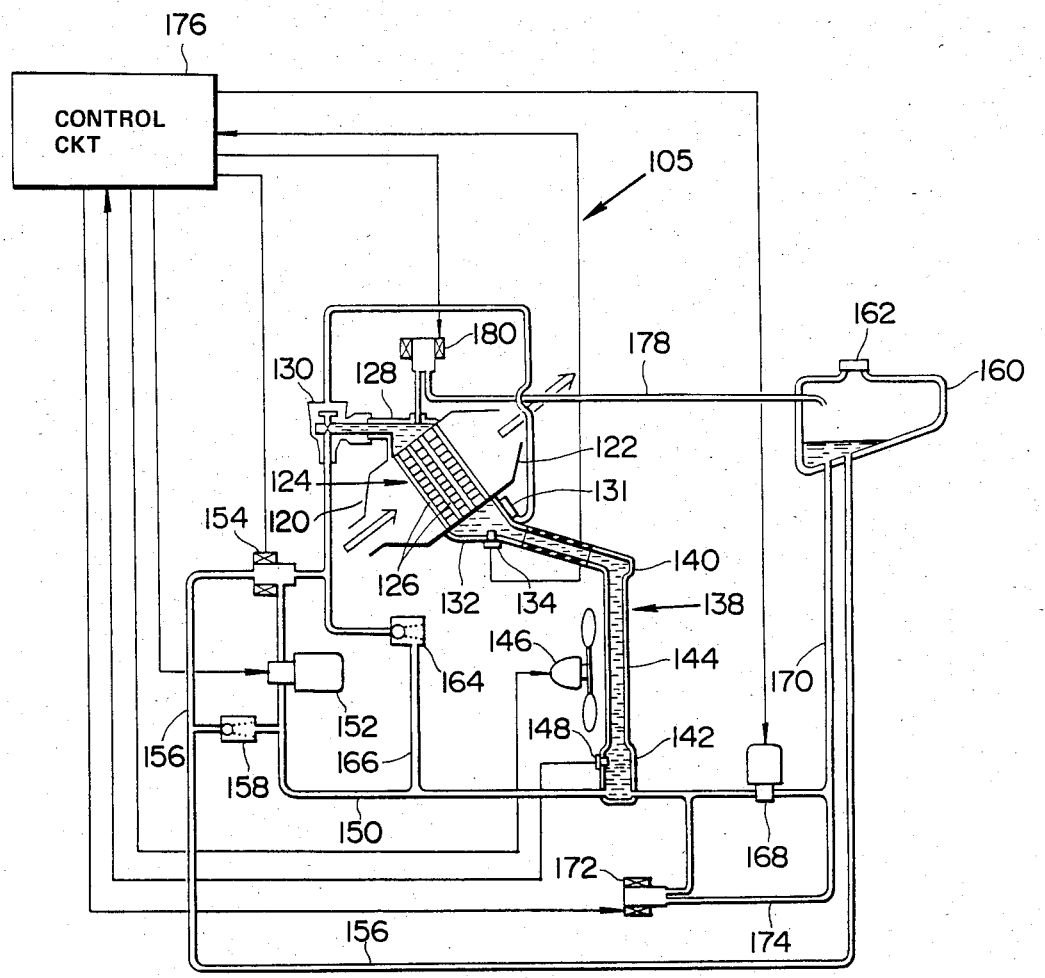
FIG. 5 shows the arrangement of FIG. 4 in its non-use state wherein it is filled with liquid coolant to prevent air contamination.

With the present invention it is very important to ensure that all non-condensible matter such as air is excluded from the system. In order to achieve this the present invention provides for the system to be completely filled when not in use and for any non-condensible matter which may have found its way into the system to be purged during the initial stages of the intercooler being put into use. To this end the system is completely filled with coolant such as shown in FIG. 5.

When the engine with which the invention is associated, is started and the control circuit supplied with electrical power, electromagnetic valve 172 closes and if the temperature sensor 134 senses the temperature of the coolant in the system as being below a predetermined level (45° C. for example) then valve 180 is energized and pump 168 operated for a predetermined period of time. This inducts coolant from reservoir 160 via conduit 170 and forces same into the system. As valve 180 is open, the excess coolant pumped into the system overflows through the overflow conduit 178 back to the reservoir 160 displacing any air or the like that may have found its way into the system. The period of time for which the pump is operated may be 3 to 5 seconds for example. Upon stoppage of the pump 168 after this purging operation, valve 180 is again de-energized, while valve 154 and pump 152 are subsequently energized. This inducts coolant out of the cooling circuit and pumps same via conduit 156 to the reservoir 160. Due to the reduction in coolant volume, the pressure within the system lowers. Simultanously, the hot air which is passing through the evaporator 124 due to the operation of the turbocharger, warms the coolant which begins to generate vapor pressure. When the coolant is water the saturation temperature is approximately 60° C. at 0.2 atmos absolute pressure. This, in combination with the operation of the pump 152 drains the liquid coolant out of the system and pumps same into the reservoir 160. During this operation, if an excessively low pressure (for example less than 0.2 atmos.) develops within the system, relief valve 158 opens until sufficient vapor pressure develops and obviates any tendancy for the conduiting and the like constituting the intercooler to be crushed by the external atmospheric pressure. In this embodiment the rate at which coolant may flow into the system through the relief valve 158 is greater than the rate at which coolant can be pumped out of the system by pump 152.

When the coolant level falls to that of level sensor 148, valve 154 is de-energized to establish communication between the pump 152 and the expansion valve 130. Simultaneously, fan 146 is energized to induce condensation of the vapor which fills the radiator 138. As the condensation proceeds the pressure within the radiator 138 drops inducing vapor from the evaporator 124 to flow theretoward.

The conversion of liquid coolant to its gaseous form via the absorption of its latent heat of vaporization removes the heat from the air flowing through the evaporator 124. The temperature of the air discharged from the intercooler is regulated via the pressure generated in the bulb 131 and the output of the temperature sensor 134. Viz., if the temperature of the effluent from the evaporator tubes 126 is above a predetermined level, the expansion valve 130 is opened to increase the amount of liquid coolant sprayed into the distribution chamber 128 and thus increase the amount coolant which may be converted into vapor. Simultaneously the operation of the fan 146 is controlled in response to the output of the temperature sensor 134 in a manner that upon the temperature sensed thereby increasing above a predetermined level the fan 146 is energized to increase the rate of condensation in the radiator 138. This, in combination with the coolant flow control provided by of the expansion valve 130 functions to maintain the temperature of the evaporator effluent essentially constant and therefore the temperature of the air discharged from the intercooler essentially constant.

During normal operation, should the rate of condensation within the radiator increase beyond control due to external influences, such as very low atmospheric temperature or the like, and the pressure within the cooling circuit drops below the previously mentioned low limit, then coolant will flow into the system from the reservoir 160 via relief valve 158. This will tend to partially fill the radiator 138 with coolant and thus reduce the heat exchange efficiency thereof by reducing the surface area available for the vapor introduced thereinto to release its latent heat to the atmosphere. Upon the level of coolant rising above the level sensor 148, the control circuit 176 energizes valve 154 to direct the output of pump 152 back to the reservoir 160. However, as the rate at which coolant may enter through the relief valve 158 is greater than the rate of discharge of the pump 152, the level of coolant within the radiator 138 rises. Accordingly, as the supply of coolant to the expansion valve 130 is momentarily terminated while the amount of heat which may be released by the radiator 138 is decreased by the partial filling of the radiator with liquid coolant, the vapor pressure within the system very quicky returns to a safe level and permits the relief valve 158 to close. Any excess coolant in the radiator 138 is directed back to the reservoir through the valve 154 under the influence of the pump 152. Upon the level of coolant falling to that of the level sensor 148, valve 154 is de-energized and the system re-enters normal operation.

Should any excess coolant tend to enter the system by leaking in past the pump 168 or via relief valve 158, for example, in sufficient quantity to immerse the level sensor, pump 152 is again temporarily energized to permit this excess to be directed back to the reservoir 160. However, as this operation is very brief no noticeable effect on the temperature control by the intercooler occurs.

When the engine 100 is stopped the control circuit can be simultaneously de-energized or it can be maintained operative for a short period. Upon deenergization of the control circuit, valve 172 is deenergized and opens. Accordingly, the coolant in the reservoir 160 flows into the system via conduit 170 and valve 172. As there is essentially no non-condensible matter in the system the latter is completely filled with liquid coolant upon all of the vapor therein condensing to liquid form. Accordingly, no negative pressure prevails within the system when the engine is not used whereby the tendency for any contaminating air to find its way in is eliminated. However, in the event that some air is inducted during running of the vehicle, under the influence of the sub-atmospheric pressure which is maintained throughout the operation of the intercooler, this air will be purged out upon a cold (below 45° C.) restart of the engine.

The reason that all air and the like non-condensible matter should be excluded from the system is that it tends to block and badly impair the heat exchange capacity of the radiator. Viz., any air which finds its way into the radiator tends to rise countercurrent to the coolant vapor which in the process of condensing decends. This produces a kind of "embolism" in the radiator which drastically impairs its utility.

Figure 6:
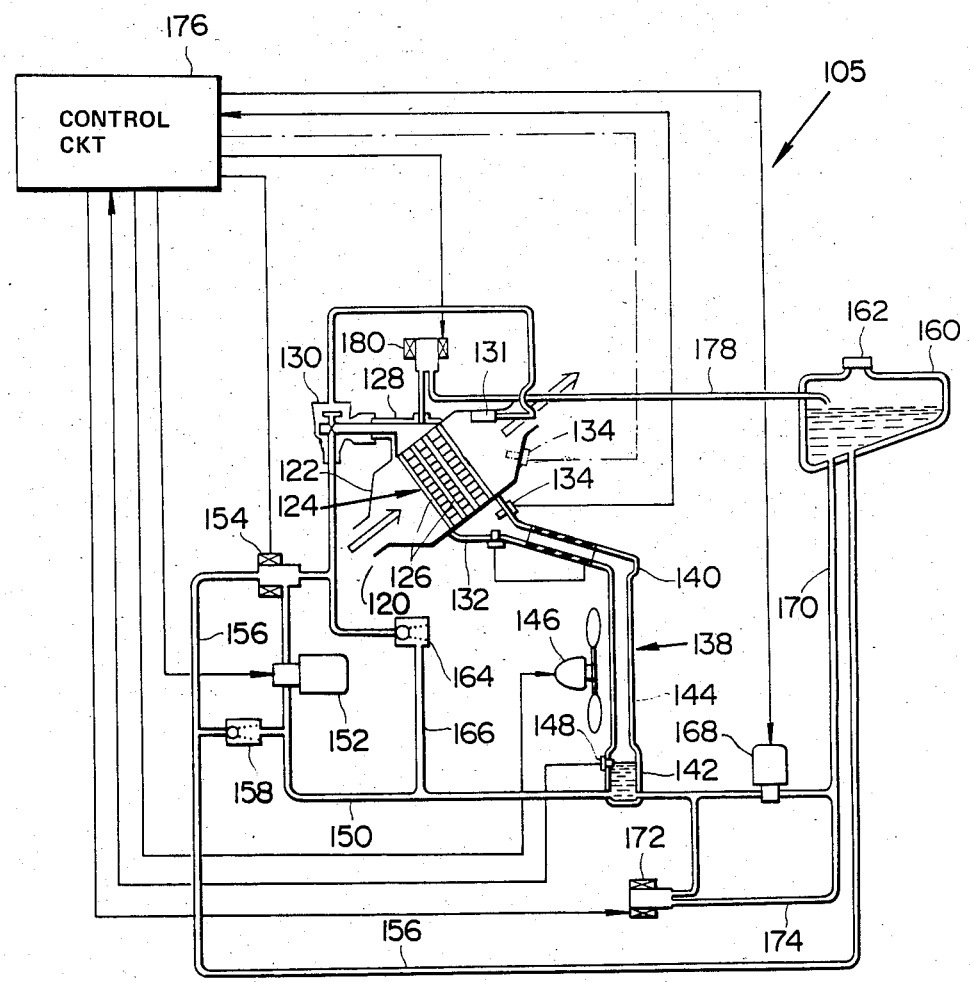
FIG. 6 is a view similar to that shown in FIG. 4 which shows a second embodiment of the present invention.

FIG. 6 shows a second embodiment of the present invention. In this embodiment the expansion valve control bulb 131 is disposed within the housing 122 so as to be directly exposed to the air which is flowing through the intercooler and thus responsive to the temperature of the air actually being charged into the cylinders. In this embodiment the temperature sensor 134 may also be disposed in the housing proximate the bulb (as shown in phantom) if desired.

Figure 7:
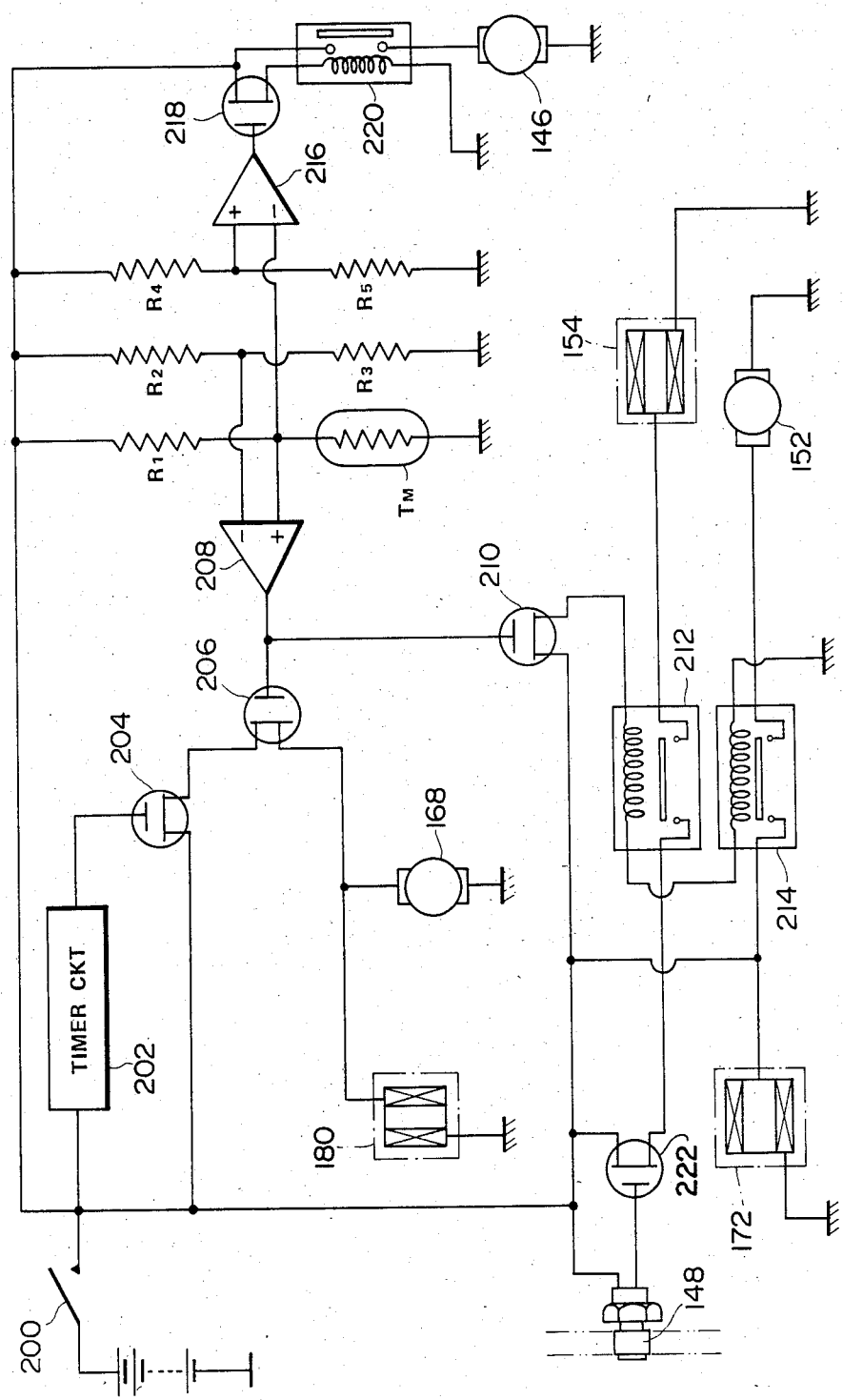
FIG. 7 is a circuit diagram of an example of the circuitry which may be used in the first and second embodiments.

FIG. 7 shows an example of a circuit arrangement which can be used in the control circuit. As shown this circuit includes a switch 200 which advantageously is operated synchronously with the ignition switch of the engine to which the present invention is applied. A timer circuit 202 is arranged to be responsive to the closure of the switch in a manner to output a signal to the base of transistor 204 which renders same conductive. A second transistor 206 is circuited with transistor 204 in a manner that while transistor 204 is conductive, if transistor 206 is rendered conductive by an output of a comparator 208, pump 168 and valve 180 are energized. The comparator 208 is arranged to receive on its non-inverting terminal (+) an input from a first voltage divider comprised of resistor R1 and thermistor $T_M$ (which forms the heart of temperature sensor 134). The inverting terminal (−) of the comparator 208 receives a reference signal from a second voltage divider comprised of R2 and R3. The reference voltage produced by the second voltage divider (R2, R3) is selected so that as long as the temperature of the coolant within the cooling circuit of the intercooler is below 45° C. (for example) the comparator 208 outputs a high level signal. This arrangement of course controls the purging operation which ensures that the system of the invention remains free from non-condensible matter throughout its working life. However, during the purging it is necessary that neither pump 152 nor valve 154 be energized. Accordingly, the output of the comparator 208 is also applied to the base of transistor 210 which when rendered conductive permits current to flow through the series connected (alternatively parallel connection is also acceptable) coils of normally closed relays 212, 214. Accordingly, during the purging operation, the valve and motor are securely prevented from being energized.

A second comparator 216 receives an input from the first voltage divider on its inverting terminal (−) and a reference voltage tapped off from a third voltage divider arrangement comprised of resistors R4 and R5, is applied to the non-inverting terminal thereof. The resistances of resistors R4, R5 are selected so that upon the temperature of the coolant rising above a predetermined level (e.g. 60° C.) the comparator 216 outputs a high level signal which energizes fan 146 via rendering a transistor 218 conductive and inducing a relay 220 to close under the influence of current passing through the coil thereof. Accordingly, each time the temperature of the coolant is sensed by the temperature sensor as being above 60° C., the fan 146 will be energized to increase the rate of condensation within the radiator 138.

Level sensor 148 is circuited with a transistor 222 so that upon the level of coolant rising thereabove, the transistor 222 is rendered conductive and valve 154 energized so that the output of the pump 152 is directed to the reservoir 160. Valve 172 remains energized as long as switch 200 is closed.

It will be appreciated that the above is merely an example of a control circuit for use with the present invention. Alternatively, the control may be provided by a microprocessor which is suitably programmed to provide the desired control. This microprocessor may also be used to control the engine as well as the intercooler.

The coolant used in the embodiments disclosed hereinbefore is preferably water. The water of course may contain additives such as anti-freeze etc. However, the use of other coolants is within the perview of the present invention.

In the embodiments disclosed hereinbefore, it is possible to eliminate pump 168 by disposing valve 172 in its place, eliminating the branch conduit 174 and disposing reservoir 160 at a level which is higher than valve 180. Thus upon opening of valve 180, gravity will force additional coolant into the system in sufficient quantity to displace any non-condensible matter out to the atmospheric side of valve 180.

The various possible variations which may made to the above disclosed arrangements will be obvious to those skilled in the art to which this invention pertains.

What is claimed is:

1. In an arrangement having a passage through which heated fluid flows,
    a device for cooling said heated fluid comprising:
    first heat exchange means including a first heat exchanger exposed to said heated fluid for vaporizing liquid coolant;
    second heat exchange means including a second heat exchanger for condensing coolant vapor formed in said first heat exchanger;
    means responsive to a parameter which varies with the temperature of the fluid in said passage downstream of said first heat exchanger, said parameter responsive means increasing the heat exchange between said first heat exchanger and a cooling medium in contact with said first heat exchanger;
    a first pump for pumping liquid coolant from said second heat exchanger to said first heat exchanger;
    a reservoir;
    a first valve which controls fluid communication between said reservoir and one of said first and second heat exchangers, said first valve including means for opening and establishing fluid communication between said reservoir and said one of said first and second heat exchangers when said cooling device is not in use.

2. A cooling device as claimed in claim 1, further comprising:
    a level sensor disposed in said second heat exchanger; and
    a second valve responsive to the output of said level sensor for directing the discharge of said first pump to said reservoir while the level of liquid coolant in said second heat exchanger is higher than said level sensor and for directing the discharge of said first pump to said first heat exchanger when the level of liquid coolant in said second heat exchanger is at that of said level sensor.

3. A cooling device as claimed in claim 2, further comprising:
    a second pump for pumping liquid coolant from said reservoir into said first and second heat exchangers; and
    a third valve located at the highest level of said first and second heat exchangers, said third valve opening when said second pump is energized and arranged to direct the excess coolant forced into said first and second heat exchangers back to said reservoir.

4. A cooling device as claimed in claim 3, further comprising a relief valve which permits liquid coolant to flow from said reservoir into said first and second heat exchangers upon a predetermined low pressure prevailing therein.

5. A cooling device as claimed in claim 1, wherein said cooling device includes a non-condensible matter displacement control valve located at the highest level of said first and second heat exchangers, said control valve including means for being temporarily opened when said first and second heat exchangers are filled with liquid coolant to permit an overflow of coolant to said reservoir to displace any non-condensible matter which has collected in said first and second heat exchangers.

6. A cooling device as claimed in claim 1, further comprising a flow control valve interposed between said pump and said first heat exchanger, said flow control valve including means for varying the amount of coolant admitted to said first heat exchanger in response to a parameter which varies with the temperature of said fluid downstream of said first heat exchanger.

7. A cooling device as claimed in claim 6, wherein said flow control valve includes means for spraying said coolant into said first heat exchanger.

8. A cooling device as claimed in claim 1, further comprising a temperature sensor exposed to the vapor produced in said first heat exchanger or said fluid flowing in said passage downstream of said first heat exchanger, said temperature sensor forming part of said parameter responsive means.

9. A cooling device as claimed in claim 8, wherein said parameter responsive means further includes a fan and said cooling medium takes the form of air, and wherein said fan induces a cooling draft of air to flow over said second heat exchanger, said fan being responsive to the output of said temperature sensor.

10. A cooling device as claimed in claim 1, wherein said arrangement is an internal combustion engine, said passage is an induction passage which leads to a combustion chamber of said engine and wherein said cooling device is an intercooler interposed between a supercharging device and said combustion chamber.

11. In an arrangement having a passage through which heated fluid flows,
a device for cooling said heated fluid comprising:
first heat exchange means including a first heat exchanger in contact with said heated fluid for vaporizing liquid coolant;
second heat exchange means including a second heat exchanger for condensing coolant vapor formed in said first heat exchanger;
means responsive to a parameter which varies with the temperature of the fluid in said passage downstream of said first heat exchanger, said parameter responsive means increasing the heat exchange between said first heat exchanger and a cooling medium in contact with said first heat exchanger;
a vessel in which the liquid coolant condensed in said second heat exchanger is collected;
a pump for pumping liquid coolant from said vessel to said first heat exchanger;
said first heat exchanger, said second heat exchanger, said vessel and said pump forming part of a closed loop cooling circuit;
a reservoir discrete from said cooling circuit;
a valve which controls fluid communication between said reservoir and the cooling circuit, said valve including means for opening and establishing fluid communication between said reservoir and the cooling circuit when said cooling device is not in use.

12. In an arrangement having a passage through which heated fluid flows,
a device for cooling said heated fluid comprising:
first heat exchange means including a first heat exchanger exposed to said heated fluid for vaporizing liquid coolant;
second heat exchange means including a second heat exchanger for condensing coolant vapor formed in said first heat exchanger;
means responsive to a parameter which varies with the temperature of the fluid in said passage downstream of said first heat exchanger, said parameter responsive means increasing the heat exchange between said first heat exchanger and a cooling medium in contact with said first heat exchanger;
a pump for pumping liquid coolant from said second heat exchanger to said first heat exchanger; and
a flow control valve interposed between said pump and said first heat exchanger, said flow control valve including means for varying the amount of coolant admitted to said first heat exchanger in response to a parameter which varies with the temperature of said fluid downstream of said first heat exchanger.

* * * * *